(12) United States Patent
Walbert

(10) Patent No.: US 9,978,246 B2
(45) Date of Patent: May 22, 2018

(54) ALERT SYSTEM FOR DETECTING RISING WATER LEVELS

(71) Applicant: Belinda J. Walbert, Park Hills, MO (US)

(72) Inventor: Belinda J. Walbert, Park Hills, MO (US)

( * ) Notice: Subject to any disclaimer, the term of this patent is extended or adjusted under 35 U.S.C. 154(b) by 0 days. days.

(21) Appl. No.: 15/715,976

(22) Filed: Sep. 26, 2017

(65) Prior Publication Data

US 2018/0089981 A1    Mar. 29, 2018

Related U.S. Application Data

(63) Continuation-in-part of application No. 15/383,874, filed on Dec. 19, 2016, now Pat. No. 9,805,578, which is a continuation of application No. 14/869,288, filed on Sep. 29, 2015, now Pat. No. 9,576,463, which is a continuation-in-part of application No. 14/305,627, filed on Jun. 16, 2014, now Pat. No. 9,163,977, which is a continuation of application No. 13/586,565, filed on Aug. 15, 2012, now Pat. No. 8,786,453.

(51) Int. Cl.
| | | |
|---|---|---|
| G08B 21/00 | (2006.01) |
| G08B 21/10 | (2006.01) |
| G08B 21/20 | (2006.01) |
| G01F 23/64 | (2006.01) |

(52) U.S. Cl.
CPC ............. *G08B 21/10* (2013.01); *G01F 23/64* (2013.01); *G08B 21/20* (2013.01)

(58) Field of Classification Search
CPC .......... G08B 21/10; G08B 21/20; G01F 23/64

USPC .................................................. 340/618–624
See application file for complete search history.

(56) References Cited

U.S. PATENT DOCUMENTS

| | | |
|---|---|---|
| 2,980,775 A | 4/1961 | Crain |
| 3,310,795 A | 3/1967 | David |
| 4,080,985 A | 3/1978 | Eagle |
| 4,153,881 A | 5/1979 | Permut et al. |
| 4,757,305 A | 7/1988 | Peso |
| 4,800,372 A | 1/1989 | Poteet |
| 4,804,947 A | 2/1989 | Geleziunas |
| 4,879,545 A | 11/1989 | Aguilar |
| 4,973,947 A | 11/1990 | Tax |
| 5,083,956 A | 1/1992 | Chraghchian et al. |
| 5,151,685 A | 9/1992 | Spicer et al. |
| 5,199,813 A | 4/1993 | Nagler |
| 5,283,569 A | 2/1994 | Nelson |
| 5,781,117 A | 7/1998 | Rish |
| 5,862,775 A | 1/1999 | Stroud |
| 6,480,113 B1 | 11/2002 | Esposito |
| 6,558,216 B2 | 5/2003 | Yerazunis et al. |
| 6,786,091 B1 | 9/2004 | Aleali |
| 7,068,175 B1 | 6/2006 | Pennington |
| 7,417,552 B1 | 8/2008 | Vaskovic |
| 7,418,861 B2 | 9/2008 | Fling et al. |
| 8,339,269 B2 | 12/2012 | Sherron |

(Continued)

FOREIGN PATENT DOCUMENTS

CN        201402170        2/2010

*Primary Examiner* — Eric M Blount
(74) *Attorney, Agent, or Firm* — Lewis Rice LLC

(57) ABSTRACT

A portable, self-contained flood alarm which alleviates the shortcomings of the alarms of the prior art and offers an easy-to-use and reliable flood and water level alarm which will adequately warn users of potential flood conditions and possibly save their personal belongings, equipment and lives.

9 Claims, 6 Drawing Sheets

(56) References Cited

U.S. PATENT DOCUMENTS

2005/0099311 A1  5/2005  Eskins
2005/0109104 A1  5/2005  Fling et al.

ALERT SYSTEM FOR DETECTING RISING WATER LEVELS

CROSS REFERENCE TO RELATED APPLICATION(S)

This Application is a Continuation-In-Part (CIP) of U.S. Utility patent application Ser. No. 15/383,874, Dec. 19, 2016, which is a Continuation of U.S. Utility patent application Ser. No. 14/869,288 filed on Sep. 29, 2015 and now U.S. Pat. No. 9,576,463, which is in turn a Continuation-In-Part (CIP) of U.S. Utility patent application Ser. No. 14/305,627, filed Jun. 16, 2014 and now U.S. Pat. No. 9,163,977 which is in turn a Continuation of U.S. Utility patent application Ser. No. 13/586,565, filed Aug. 15, 2012 and now U.S. Pat. No. 8,786,453. The entire disclosure of all the above references is herein incorporated by reference.

BACKGROUND OF THE INVENTION

1. Field of the Invention

This disclosure is related to the field of water level alert and flood detector systems. Specifically, this disclosure is related to simple, lightweight, portable water level detectors that can be permanently or removeably attached to any surface or terrain, the system providing a warning should the water reach a predetermined and potentially dangerous level.

2. Description of Related Art

There are few places on Earth where people need not be concerned about flooding. Any place where rain falls is vulnerable, although rainfall is not the only cause of flooding. Floods and the water damage caused by flooding are among the most frequent and costly natural disasters and can develop in a myriad of different ways. One common way floods occur is when rivers or streams overflow their banks from excessive rain, a ruptured dam or levee, or rapid ice melt.

While some floods can develop over hours or days, giving individuals some time to prepare or evacuate, others, commonly known as "flash floods," can develop quickly and without warning. These flash floods can be extremely dangerous, and often are marked by a dangerous wall of roaring water carrying rocks, mud and other debris.

The moving water which results from floods has awesome destructive power. Usually structures are poorly equipped to withstand flood water's strength. In extreme cases, bridges, houses, trees and cars can be picked up and carried off, personal possessions and property can be destroyed, and even animals and individuals can be harmed. For example, in the United States floods do approximately about 6 billion dollars' worth of damage and kill about 140 people every year.

Because of the danger to lives and property posed by flooding, there is a need for a simple, lightweight, portable flood alert and alarm system that can activate a warning means to notify an individual prior to a potentially disastrous or dangerous flood. Such an alarm system would give individuals sufficient warning to vacate a potentially dangerous flood area and move their personal possessions and property to a safer and more secure area. Stated differently, there is a need for a portable device that can be moved and utilized in homes, on camping trips, or at any location where there is a possibility of flooding so that individuals in the area of the potential flood can be warned within a sufficient amount of time so as to protect and move themselves and their valuables.

While there are a number of devices available for warning of the onset of a flood in areas prone to flooding, many of these devices are problematic. First, many of these devices are not lightweight or easily portable. Accordingly, it can be cumbersome and unwieldy to transport and place the detectors in at-risk flood areas. In addition, many of these devices are expensive and/or have a complex structure that is difficult to understand, set-up, and program. Another problem with these devices currently utilized in the art is that they often malfunction. Many of these devices are float-based systems. Typically, these float systems detect a rising level of water, or some other liquid, and sound an alarm to alert others of the rising liquid condition. In some of these systems, the buoyant floats contain a sensor which, when raised or otherwise moved by the presence of flood water, closes an electrical circuit when it reaches a certain pre-defined point, thereby engaging the alarm. The problems with these sensor float activated systems can be numerous. First, water present in the flood situation can impair or short circuit the electrical circuit. In these situations, even if the float is raised and an alarm should be triggered, no alarm will sound because the circuit will not be completed. This damage generally renders the device useless. Second, in addition to water damage, debris or other detritus in the flood water can become stuck to the float or the circuit. This debris can catch the float, preventing it from moving with the rising flood waters, or it can become caught in the sensor or circuit, preventing a complete connection and sounding of the alarm. Finally, many of these systems are either constructed to alert for gradual flooding or flash flooding, they do not adequately monitor and alert a user to either type of flooding. Thus, these currently utilized systems are susceptible to damage and being put out of commission by excessive flooding.

Accordingly, there is a need for the development of a portable, self-contained flood alarm which alleviates the shortcomings of the alarms of the prior art and offers an easy-to-use and reliable flood and water level alarm which will adequately warn users of potential flood conditions and possibly save their personal belongings, equipment, and lives. The device and system disclosed herein achieves its intended purposes, objectives, and advantages over the prior art through a new, useful, and nonobvious combination of component elements, which is simple to use, contains a minimum number of functioning parts, is economical to manufacture and assemble, and is not as susceptible to the problems inherent to the structure and design of the flood warning systems of the prior art.

SUMMARY OF THE INVENTION

Because of these and other problems in the art, described herein, among other things, is a portable, self-contained flood alarm which alleviates the shortcomings of the alarms of the prior art and offers an easy-to-use and reliable flood and water level alarm which will adequately warn users of potential flood conditions and possibly save their personal belongings, equipment, and lives.

In an embodiment disclosed herein, the self-contained flood alarm is comprised of an alert device for detecting rising water levels, the alert device comprising: a weighted base plate; a main body having an anterior end and a posterior end, a length therebetween and a hollow interior, the posterior end of the main body being attached to the base plate and positioned approximately vertically therefrom; a stabilizing rod having an anterior end and a posterior end and a length therebetween, the posterior end of the stabilizing rod being attached to the base plate and extending approximately vertically therefrom into the interior of the main body; a float, the float being moveably attached to the stabilizing rod smaller in diameter than the main body; a water level rod having an anterior end and a posterior end and a length therebetween, the float being attached to the water level rod at or near its posterior end and the water level rod extending approximately vertically therefrom into the interior of the main body; and an alarm assembly located at or within the anterior end of the main body, the alarm assembly having an activation mechanism.

In an embodiment of the alert device it is contemplated that the main body is perforated.

In an embodiment of the alert device, it is contemplated that the anterior end of the main body will be attached to the base plate via an attachment methodology that creates a space between the posterior end of the main body and the base plate, thereby allowing for rising flood waters to enter and leave the hollow interior of the main body.

In an embodiment of the alert device, it is contemplated that the water level rod is adjustably attached to the float.

In an embodiment of the alert device, it is contemplated that the activation mechanism of the alarm assembly will be activated when rising water causes the float and the attached water level rod to rise approximately vertically along the path of the stabilizing rod within the main body until the anterior end of the water level rod comes into contact with the activation mechanism of the alarm assembly, thereby activating the alarm assembly.

In an embodiment, the alert device further comprises at least once PVC coupling, a grate and a cap, wherein the at least one PVC coupling is connected to the posterior end of the main body, the grate is locate within the coupling, the alarm assembly is located within the PVC coupling and the cap seals the interior of the main body and at least one PVC coupling.

In an embodiment of the alarm assembly it is contemplated that the device will be portable. In an embodiment of this portable alarm assembly, it is contemplated that the device will be further comprised of a handle, the handle being located somewhere on the external surface area of the device.

In an embodiment of the alarm assembly, it is contemplated that the assembly will be further comprised of a door in the main body, the door allowing a user access to the hollow interior of the main body.

In an embodiment of the alarm assembly, it is contemplated that the device is permanent.

In another embodiment, there is described herein a method for alerting an individual in a temporary location of rising nearby water levels, the method comprising: providing an alert device, the alert device comprising: a weighted base plate; a handle; a main body having an anterior end and a posterior end, a length therebetween and a hollow interior, the posterior end of the main body being attached to the base plate, and the anterior end of the main body being attached to the handle; a stabilizing rod having an anterior end and a posterior end and a length therebetween, the posterior end of the stabilizing rod being attached to the base plate and extending approximately vertically therefrom into the interior of the main body; a float, the float being moveably attached to the stabilizing rod and smaller in diameter than the main body; a water level rod having an anterior end and a posterior end and a length therebetween, the float being attached to the water level rod at or near its posterior end and the water level rod extending approximately vertically therefrom into the interior of the main body; and an alarm assembly located at or within the anterior end of the main body, the alarm assembly having an activation mechanism; carrying the alert device to a temporary location proximate a body of water using the handle; placing the alert device in the temporary location by lowering the alert device onto the weighted base using the handle; and leaving the alert device resting in the temporary location.

In an embodiment of the method, the main body of the alert device is perforated.

In an embodiment, the method further comprises attaching the anterior end of the main body to the base plate via an attachment methodology that creates a space between the posterior end of the main body and the base plate; and placing the alert device in the temporary location so that water in the body of water does not enter the space unless the body of water has an increase in water level.

In an embodiment of the method, the water level rod of the alert device is adjustably attached to the float.

There is also described herein, an alert device for detecting rising water levels, the alert device comprising: a weighted base plate; a main body having an anterior end and a posterior end, a length therebetween and a hollow interior, the posterior end of the main body being attached to the base plate and positioned approximately vertically therefrom; a stabilizing rod having an anterior end and a posterior end and a length therebetween, the posterior end of the stabilizing rod being attached to the base plate and extending approximately vertically therefrom into the interior of the main body; a float, the float being moveably attached to the stabilizing rod smaller in diameter than the main body; a water level rod having an anterior end and a posterior end and a length therebetween, the float being attached to the water level rod at or near its posterior end and the water level rod extending approximately vertically therefrom into the interior of the main body; and an alarm assembly located at or within the anterior end of the main body, the alarm assembly having an activation mechanism; wherein the activation mechanism of the alarm assembly is activated when rising water causes the float and the attached water level rod to rise approximately vertically along the path of the stabilizing rod within the main body until the anterior end of the water level rod comes into contact with the activation mechanism of the alarm assembly, thereby activating the alarm assembly; and wherein when the activation mechanism is activated, the activation mechanism triggers an alarm at a location remote from the alert device.

In an embodiment of the alert device, the main body is perforated.

In an embodiment of the alert device, the anterior end of the main body is attached to the base plate via an attachment methodology that creates a space between the posterior end of the main body and the base plate, thereby allowing for rising flood waters to enter and leave the hollow interior of the main body.

In an embodiment of the alert device, the water level rod is adjustably attached to the float.

In an embodiment of the alert device, the device is portable.

In an embodiment of the alert device, the device is further comprised of a handle, the handle being located somewhere on the external surface area of the device.

In an embodiment of the alert device, the devised is further comprised of a door in the main body, the door allowing a user access to the hollow interior of the main body.

In an embodiment of the alert device, when the activation mechanism is activated, the activation mechanism sends a text message.

In an embodiment of the alert device, when the activation mechanism is activated, the activation mechanism sends an e-mail message.

In an embodiment of the alert device, when the activation mechanism is activated, the activation mechanism calls a phone number.

In an embodiment of the alert device, when the activation mechanism is activated, the activation mechanism contacts a service company.

In an embodiment of the alert device, when the activation mechanism is activated, the activation mechanism communicates with a mobile device application.

DESCRIPTION OF THE PREFERRED EMBODIMENT(S)

Figure 1:
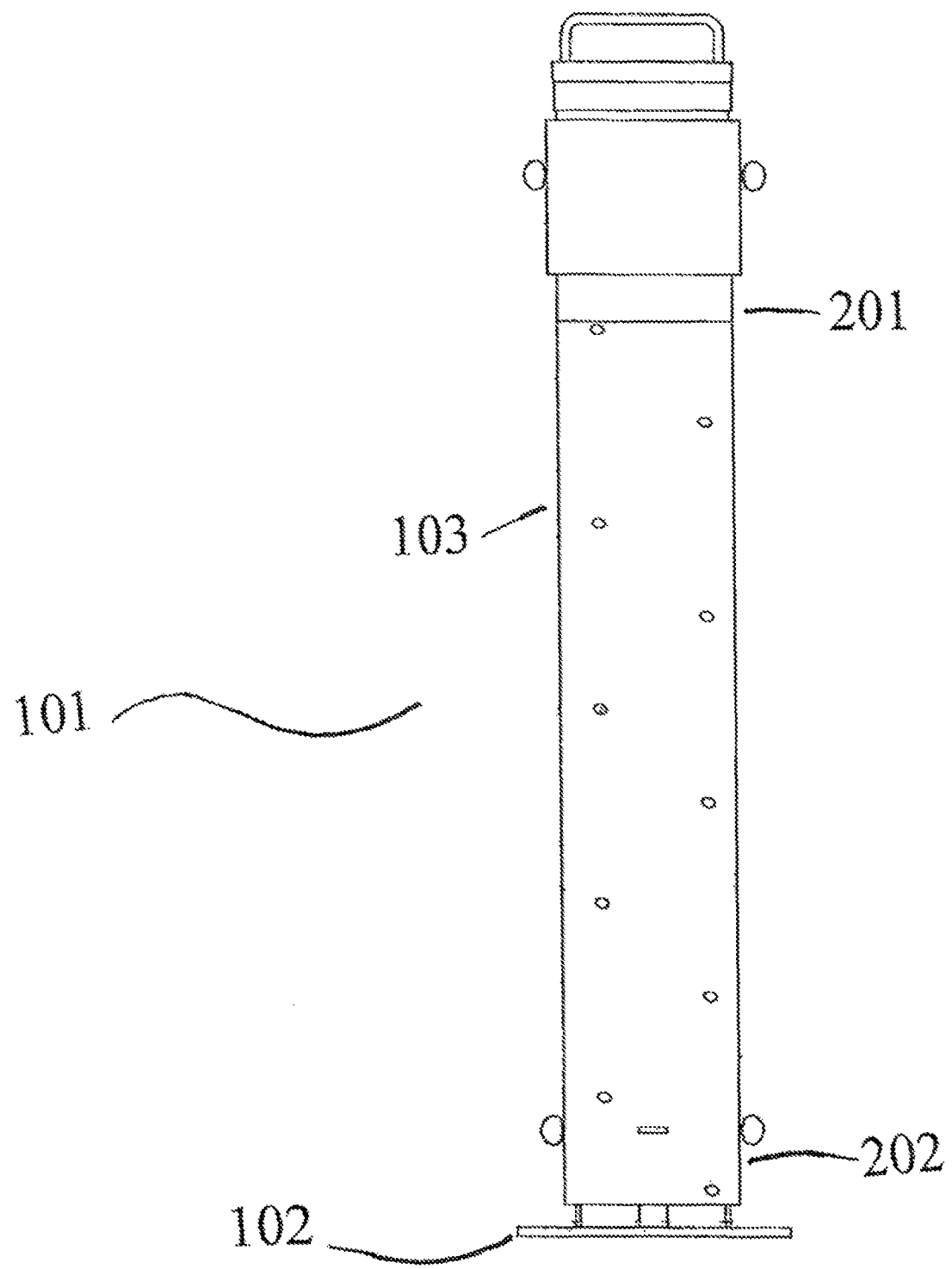
FIG. 1 provides a front perspective view of an embodiment of the small, portable, lightweight flood warning device described herein.
Figure 2:
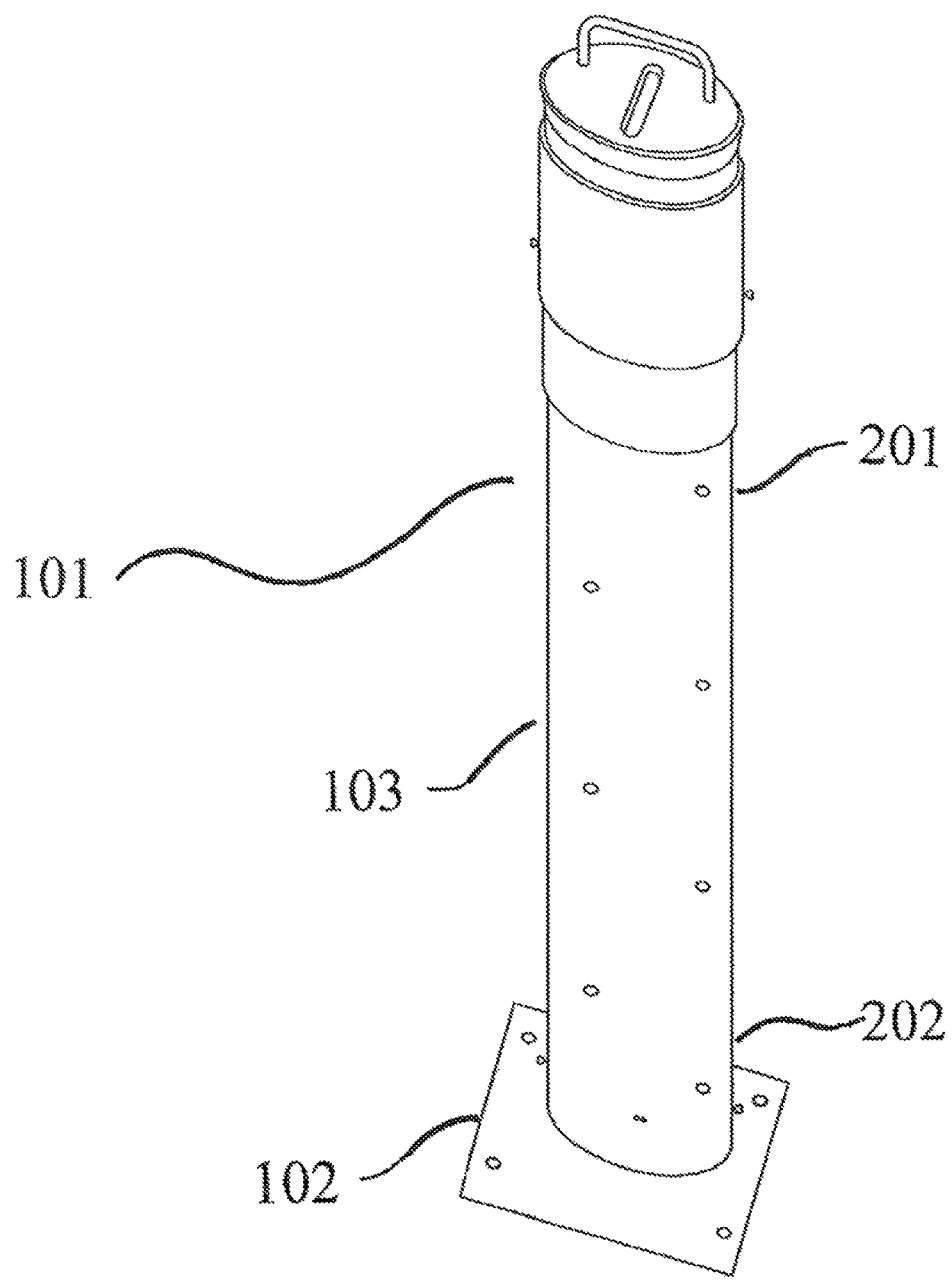
FIG. 2 provides a side perspective view of an embodiment of the small, portable, lightweight flood warning device described herein.
Figure 3:
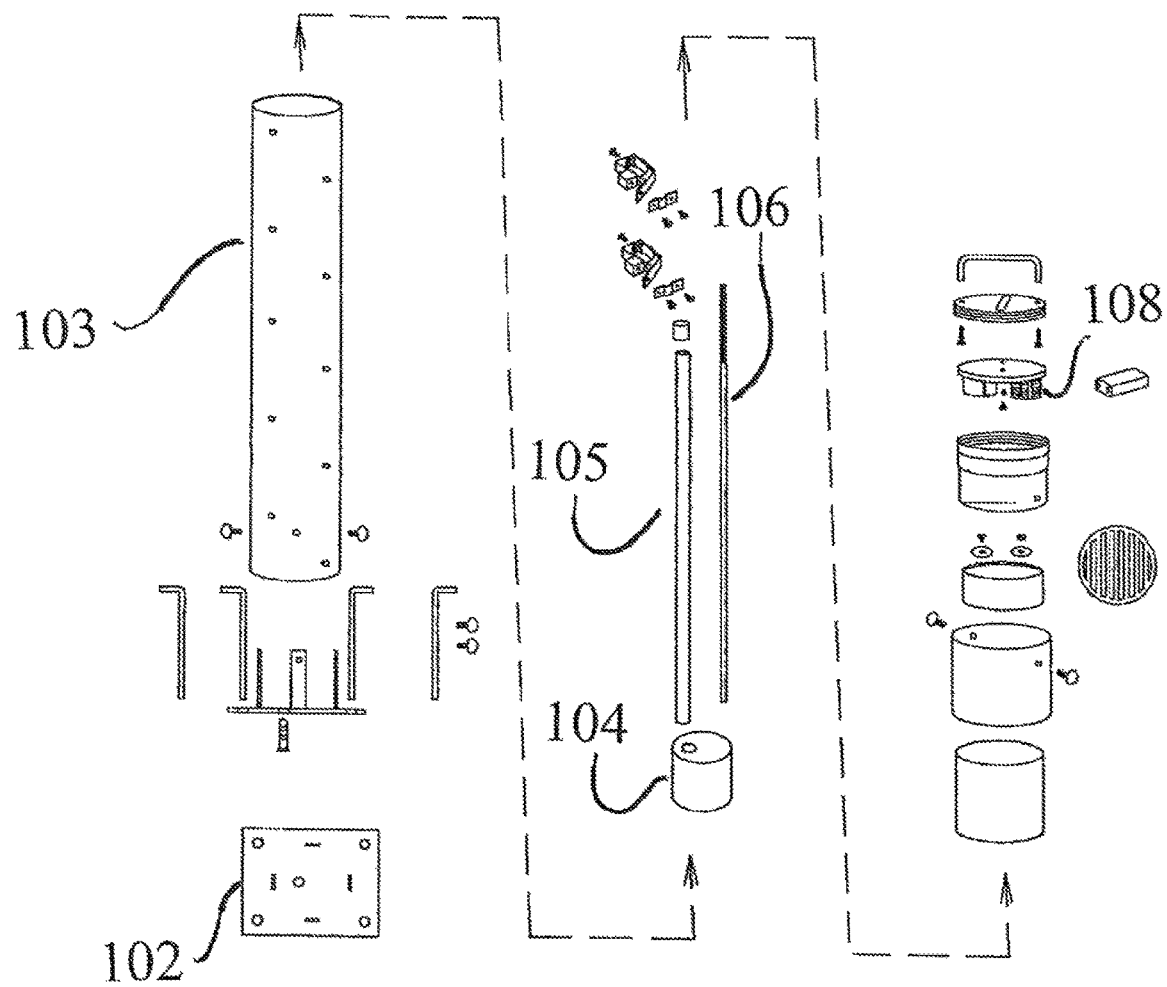
FIG. 3 provides a perspective view of the component parts of an embodiment of the small, portable, lightweight flood warning device described herein.
Figure 4:
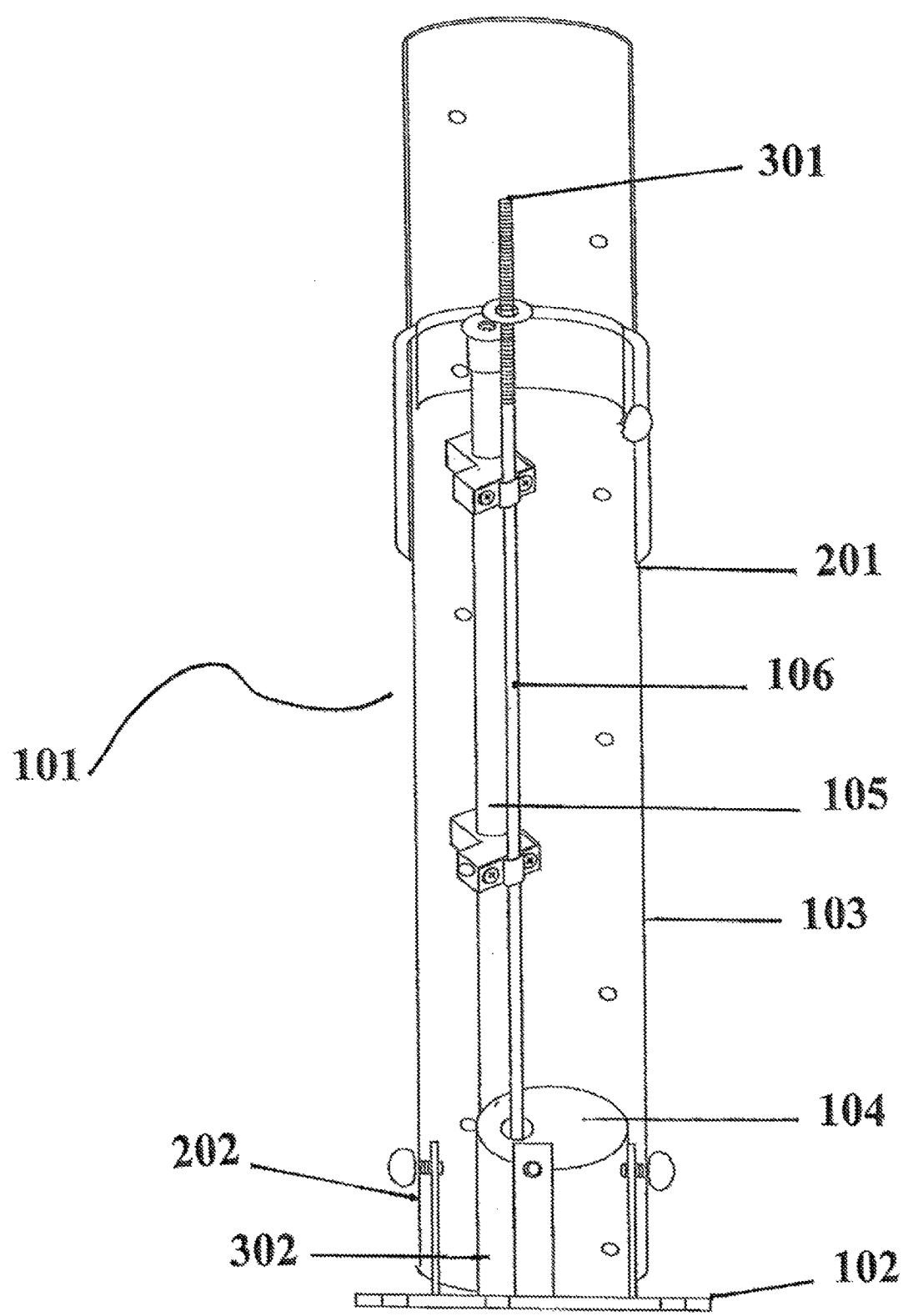
FIG. 4 provides a cut-through view of an embodiment of the small, portable, lightweight flood warning device described herein.

FIG. 1 provides a prospective view of a diagram of an embodiment of the portable rising water alert device described herein. FIG. 4 provides a cut-through of an embodiment of the portable water alert device described herein. As depicted therein, the portable rising water alert device (101) generally consists of the following components: a standing base plate (102); a main body (103); a float (104); a stabilizing rod (105); a water level rod (106); and an alarm assembly (108).

Throughout this disclosure, the term "computer" describes hardware which generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, smart phones, tablet computers, mobile devices, server farms, hardware appliances, minicomputers, mainframe computers, video game consoles, handheld video game products, and wearable computing devices including but not limited to eyewear, wrist-wear, pendants, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices which are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software can be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described here are contemplated to use computers and computer software typically stored in a computer- or machine-readable storage medium or memory.

Throughout this disclosure, terms used herein to describe or reference media holding software, including without limitation terms such as "media," "storage media," and "memory," may include or exclude transitory media such as signals and carrier waves.

Throughout this disclosure, the term "network" generally refers to a voice, data, or other telecommunications network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including but not necessarily limited to a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a network communication or network (e.g., "a remote host"), or may, in verb form, refer to a server providing a service over a network ("hosts a website"), or an access point for a service over a network.

Throughout this disclosure, the term "real time" refers to software operating within operational deadlines for a given event to commence or complete, or for a given module, software, or system to respond, and generally invokes that the response or performance time is, in ordinary user perception and considered the technological context, effectively generally cotemporaneous with a reference event. Those of ordinary skill in the art understand that "real time" does not literally mean the system processes input and/or responds instantaneously, but rather that the system processes and/or responds rapidly enough that the processing or response time is within the general human perception of the passage of real time in the operational context of the program. Those of ordinary skill in the art understand that, where the operational context is a graphical user interface, "real time" normally implies a response time of no more than one second of actual time, with milliseconds or microseconds being preferable. However, those of ordinary skill in the art also understand that, under other operational contexts, a system operating in "real time" may exhibit delays longer than one second, particularly where network operations are involved.

Throughout this disclosure, the term "transmitter" refers to equipment, or a set of equipment, having the hardware, circuitry, and/or software to generate and transmit electromagnetic waves carrying messages, signals, data, or other information. A transmitter may also comprise the componentry to receive electric signals containing such messages, signals, data, or other information, and convert them to such electromagnetic waves. The term "receiver" refers to equipment, or a set of equipment, having the hardware, circuitry, and/or software to receive such transmitted electromagnetic waves and convert them into signals, usually electrical, from which the message, signal, data, or other information may be extracted. The term "transceiver" generally refers to a device or system that comprises both a transmitter and receiver, such as, but not necessarily limited to, a two-way radio, or wireless networking router or access point. For purposes of this disclosure, all three terms should be understood as interchangeable unless otherwise indicated; for example, the term "transmitter" should be understood to imply the presence of a receiver, and the term "receiver" should be understood to imply the presence of a transmitter.

Generally, in a simplified embodiment, the portable rising water alert device (101) is assembled and functions as follows. The main body (103) of the portable rising water alert device (101) is generally any hollow pipe with an anterior end (201) and a posterior end (202) and a length therebetween. It is contemplated that the main body (103) may be comprised of any material known to those of ordinary skill in the art such as metals, plastic, wood, etc. In one embodiment, the main body (103) will be comprised of polyvinyl chloride (PVC). Further, the dimensions of the main body (103) are not determinative. In one embodiment it is generally contemplated that the height of the main body (103) in the permanent version of the device will be taller than the height of the main body (103) in the portable version of the device. For example, in one embodiment the height of the main body (103) in the portable embodiment will be no more than about 24 inches tall and the height of the main body (103) in the stationary embodiment will be no more than about 40 inches tall. Generally, this discrepancy in height will make the shorter main body (103) version generally more portable and easier to carry than the permanent version.

Similarly, while the diameter of the main body (103) is not determinative, the diameter will generally be large enough to allow for the free and unobstructed movement of the float (104) in a vertical manner along the water level rod (106) and the stabilizing rod (105) therein. For example, in a preferred embodiment the diameter of the main body (103) will be large enough in diameter to ensure that the edges of the float (104) do not come into contact with the main body (103). In one embodiment, as depicted in FIGS. 1-4, the main body (103) will be about 4 inches in diameter. Moreover, as depicted in FIGS. 1-4, in one embodiment the main body will be perforated. In this embodiment, the perforation will assist in the ingress and egress of liquid into and out of the interior of the main body (103). This embodiment will be particularly helpful in instances of flash flooding by providing for multiple access points for the sudden rush of water to enter and leave the device (101).

As depicted in FIGS. 1-4, the posterior end (202) of the main body (103) will be attached to a base plate (102). The base plate (102), as defined herein, may include any base plate or flat stand known to those of ordinary skill in the art that can act as a stabilizing platform for the main body (103) attached thereto. As such any material (e.g., metal, wood, plastic, etc.) and any shape (e.g., circle, square, rectangle, polygon) is contemplated for the base plate described herein. In a preferred embodiment, the base plate (102) will be weighted. With a weighted base plate (102) the device (101) will not need to be staked down or otherwise attached to the ground to protect it from falling over or becoming otherwise incapacitated during a rush of flood waters. This minimalization of component parts—i.e., the device does not need to be staked down or otherwise attached to the ground to properly function is a benefit in the portable version of the device (101) where simplification of the device (101) is desirable. In one embodiment, as depicted in the FIGS., the base plate will be a square metal base plate that has a larger surface area than the circumference of the main body (103) i.e., the posterior end (202) of the main body (103) will fit within the surface area of the base plate (102). Generally, any form of attachment, either permanent or temporary, known to those of ordinary skill in the art for attaching a main body (103) to a base plate (102) is contemplated. Such attachment mechanisms include, but are not limited to soldering, screwing, pinning and clipping. For example, in the embodiment depicted in FIGS. 1-4, the main body (103) will be screwed into the base plate (102). This form of attachment of the base plate (102) to the main body (103) creates an easily removable bottom for the device (101).

Notably, in a preferred embodiment, as depicted in FIGS. 1-4, the main body (103) is attached to the base plate in such a manner to create an opening or gap in between the base plate (102) and the posterior end (202) of the main body (103) such that rising flood water can enter into and leave the interior hollow space of the main body (103) through this opening. In one embodiment of the base plate (102) depicted in FIGS. 1-4, the base plate (102) will have one or more holes at or near the perimeter of the base plate (102). In this embodiment, a peg or some other form of attaching device will be utilized with the holes to more firmly attach the base plate (102) to the ground or other surface upon which it rests. For example, in the embodiment depicted in FIGS. 1-4, it is contemplated that ground pegs or stakes will be used in conjunction with the base plate (102) to attach the base plate (102) to the ground.

In addition to the main body (103), it is also contemplated that the stabilizing rod (105) will be attached to the base plate (102). The stabilizing rod (105) is a rod attached to the base plate (102) and extending vertically therefrom into the hollow interior of the Main body (103), terminating at a distance at or near the anterior end (201) of the main body (103). The stabilizing rod (105) functions as a stabilizer for the moveable float (104) of the device, defining the path along which the moveable float (104) will travel inside the main body (103). Thus, the stabilizing rod (105) generally prevents the float (104) from turning, wedging or otherwise becoming jammed inside the main body (103) it allows the float (104) to float freely and stay flat.

Generally, the dimensions of the stabilizing rod are not determinative. Any sized or shaped rod comprised of a material known to those of ordinary skill in the art that can: a) be attached in a manner to the base plate (102); b) can fit inside the length of the main body (103); and c) can be attached to the float (104) so that the float can freely travel its length is contemplated for this device (101). In one embodiment, as depicted in FIGS. 1-4, the stabilizing rod will be comprised of a ½" inch hollow PVC pipe. Further, any form of attachment, either permanent or temporary, for the stabilizing rod (105) to the base plate (102) is contemplated for the device (101). For example, the stabilizing rod (105) may be soldered, pinned, clipped or screwed into the base plate (102). In the embodiment depicted in FIGS. 1-4, the stabilizing rod (105) is a hollow PVC pipe which is attached to the base plate (102) via a hole in the base plate (102) and an insert plug. Finally, in the embodiment of the stabilizing rod (105) in which the rod is hollow, the terminating end of the stabilizing rod (105) (i.e., the end of the stabilizing rod (105) opposite to the end attached to the base plate (102)) will be topped with a cap or some other plugging methodology.

The float (104) of the device (101) may be comprised of any float (104) mechanism known to those of ordinary skill in the art. Similar to other component parts of the device (101), the dimensions of the float (104) and the materials which comprise the float (104) are not determinative. Generally, the float (104) may be comprised of any material known to those of ordinary skill in the art which will float on top of a rising liquid, specifically water. Further, the dimensions of the float (104) may take any shape so long as the float (104) is able to freely travel within the main body (103) along the length of the stabilizing rod (105) with an influx of rising flood water that comes into the interior of the main body (103) during the time of a flood situation. In a preferred embodiment, the float (104) will not touch the edges of the main body (103)—there will be a space between the float (104) and the main body (103). This preferred embodiment allows for water to flow into the device in a flood situation from both above and below the float (104)—a structure that is extremely desirable in flash flood situations where water rushing into the currently utilized float-based systems in the art can jam the float or otherwise render the device inoperable. For example, in the embodiment depicted in FIGS. 1-4 in which the main body (103) is comprised of a 4 inch diameter pipe, the float (104) may be comprised of circular float device that is generally 2 inches in diameter, creating a 1 inch space between all sides of the float (104) and the main body (103).

The float (104) of the device (101) will be attached via a two pole system; i.e., it will interface with both a stabilizing rod (105) and a water level rod (106). In an embodiment, the float (104) may be threadably attached to the stabilizing rod (105) in a manner that allows the float to freely travel the length of the stabilizing rod (105) with the ingress and egress of water into and out of the main body (103). In the embodiment of the device (101) depicted in FIGS. 1-4 and FIG. 5, the float (104) has a hole (204) through it that is greater in diameter than the diameter of the stabilizing rod (105) and the float (104) is fitted around the stabilizing rod (105) via this hole. Further, in the embodiment of the device (101) depicted in FIGS. 1-4, the float (104) has a second hole through it for attachment of the water level rod (106) to the float (104). Although the size of these two attachment holes in this embodiment of the float (104) is not determinative, in one embodiment the stabilizing hole will be about 2½ inches and the flexible rod hole will be about ¼ inches.

Figure 5:
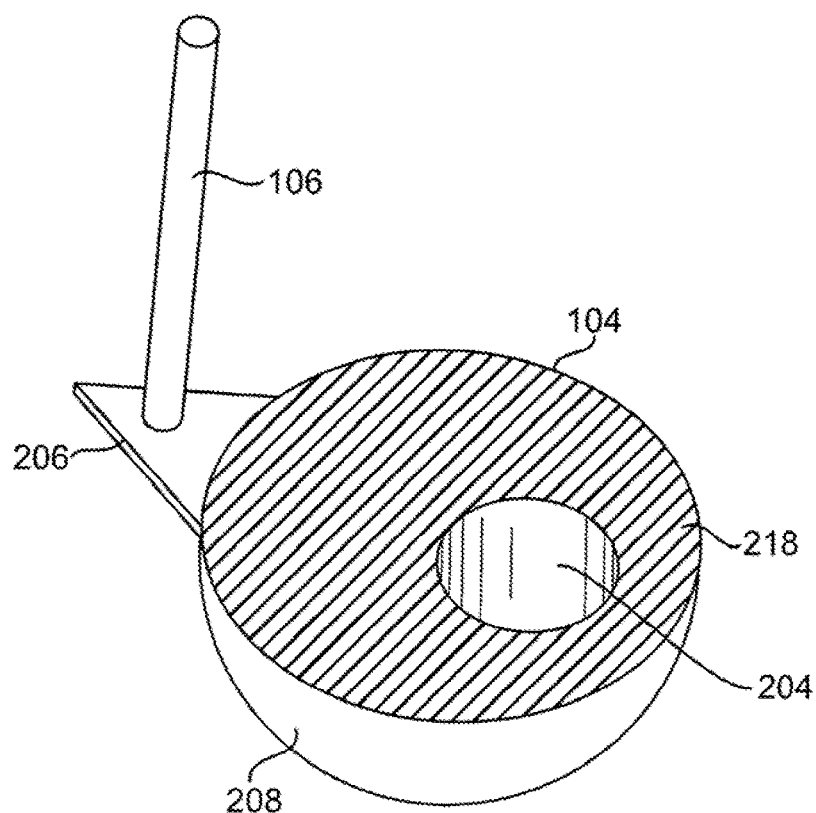
FIG. 5 provides for an alternative design of a float.

In the embodiment of FIG. 5, the water level rod (106) is not attached to the float (104) directly. Instead, the water level rod (106) is attached to a flange (206) which extends from the side of the float (104). As contemplated above, in an embodiment, the diameter of the float (104) may be substantially less than the diameter of the tube (103). In this case, the flange (206) will simply be in the space between the edge of the float (104) and the wall of the tube (103). The float (1045) in FIG. 5 also has a slightly different shape to the float in FIG. 4. In FIG. 4, the float (104) is generally cylindrical or barrel-shaped. The float (104) in FIG. 5, however, is generally hemispherical with the rounded portion arranged toward the base (102), or may be in the shape of a generally cylindrical section attached to a hemispherical lower portion (208). Providing a float (104) with a hemispherical, or similarly structured, lower portion (208) assists in the float remaining upright and flat when it is positioned on water. Like a traditional boat hull, the hemisphere when floating will tend to attempt to right itself and float with the upper portion (218) pointed away form the base (102).

Another component of the device (101) which is attached to the float (104) is the water level rod (106). The water level rod (106) is a rod with an anterior end (301) and a posterior end (302) and a length therebetween which is either permanently or adjustably attached to the float (104). The posterior end (302) of the water level rod (106) will be attached to the float (104). In the embodiment in which the attachment is adjustable, it is contemplated that the water level rod (106) will be attached to the float (104) at or near its posterior end (302). This flexible mode of attachment allows for the length of the water level rod (106) extending vertically from the float (104) to the top of the main body (103) to be changed and adjusted, thereby allowing a user to modify the flood water level at which a warming alarm would be activated. In one embodiment in which the form of attachment between the water level rod (106) and the float (104) is adjustable, the water level rod (106) will be attached to the float (104) via a washer and nut form of moveable attachment. Once the adjustable water level rod (106) is attached in this embodiment, the rod (106) will become stationary with regard to the float (104). Generally, the higher the float (104) is attached along the length of the adjustable water level rod (106), the higher a flood event that occurs will need to be to trigger the alarm.

To provide for triggering of the device (101) at different water levels, the water level rod (106) may alternatively be provided in a series of different lengths. In this way, the length of water level rod (106) may be selected by a user to correspond to the desired height of water to trigger the device (101) with shorter rods being chosen to correspond to an alarm only occurring at higher water levels. Should a lower water level trigger be desired than is available from the longest rod, multiple water level rods (106) may be attached together using a joining sleeve, by providing them with mating male and female ends, or by other methods and structures known to those of ordinary skill to produce longer resultant water level rods (106). In an embodiment, the rod segments may be substantially sorter than the length of the tube (103). For example, water level rod (106) segments of 4, 5 and 6 inches may be provided for a device (101) having a tube length of around 24 inches. In this scenario a user could set the alarm to trigger at anything from essentially any water depth (0 inches corresponding to a 24 inch resultant water level rod (106) comprised of 4 6 inch segments) to 20 inches of depth (corresponding to using a single 4 inch segment) at virtually all 1 inch intervals.

The anterior end (301) of the water level rod (106) will be the portion of the device (101) that generally enacts the alarm assembly (108). Thus, depending upon the requirements needed for the activation of the alarm assembly (108) in a particular embodiment, the anterior end (301) of the water level rod (106) may be comprised of a metal cap or other metal connection device (if a circuit needs to be completed for alarm activation) or a plastic cap or finger (if a button or switch needs to be punched or switched for activation of the alarm assembly (108)). For example, in an embodiment of the device (101) where a circuit needs to be completed for the alarm to be activated, a metal cap will be located on the anterior end (301) of the water level rod (106). In this embodiment, as the flood waters rise and the float is raised along the length of the stabilizing rod (105) within the main body (103), the anterior end (301) of the of the water level rod (106) will correspondingly rise until the time at which the metal cap located at the anterior end (301) of the water level rod (106) comes into contact with an open circuit of the alarm assembly (108) and, upon contact, completes the circuit and activates the alarm assembly (108). Stated differently, in this embodiment the metal cap or tip of the water level rod (106) will connect the metal tabs allowing the circuit to complete, resulting in alarm activation.

In other embodiments where circuit completion is not required to activate the alarm, the rising flood waters will raise the anterior end (301) of the water level rod (106) to a point at which it comes into contact with a button, switch or some other activation methodology on the alarm assembly (108) which will, in turn, generally complete the circuit and activate the alarm system, notifying individuals in the surrounding area of the impending flood situation. In some embodiments of the device (101), the anterior end (301) of the water level rod (106) will have to travel through a grate, hole, slot or device of similar filtering and stabilizing construction prior to activating the alarm assembly (108) and to provide for a vertical movement without horizontal shifting which could result in the alarm not being triggered. One such grate (301) is shown in FIG. 6.

The purpose of this component of the device (101) will be to filter out debris or other refuge which could be located in the water and could short circuit, jam or otherwise impede the activation of the alarm assembly (108). Further, this component serves to stabilize the water level rod (106) prior to coming into contact with the activation methodology on the alarm assembly (108), stabilizing the rod (106) and preventing it from tipping sideways or otherwise missing the activation methodology. In these embodiments it is contemplated that the anterior end (301) of the water level rod (106) will be sized and shaped in such a manner so as to travel through the grate or other filtering structure without being impeded by the filter.

Figure 6:
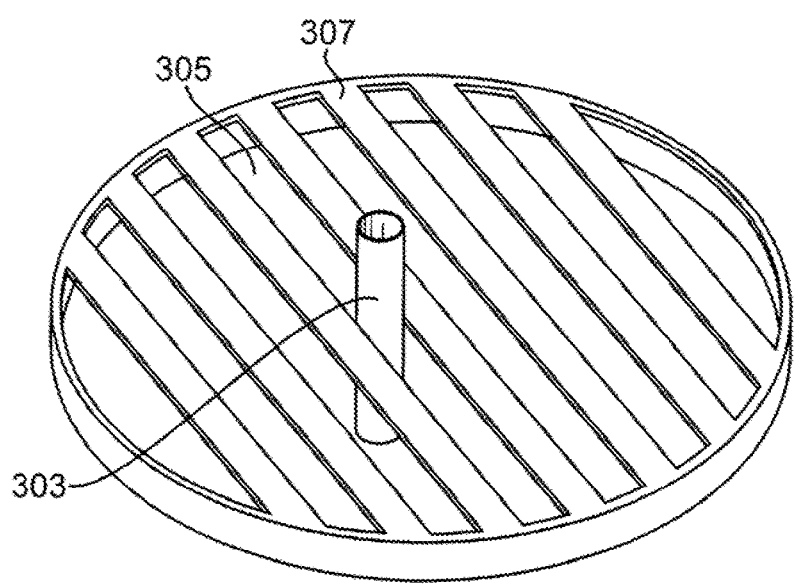
FIG. 6 provides for an embodiment of a guide grate and a guide sleeve which can be attached thereto.

In the embodiment of FIG. 6, the grate (301) includes a guide sleeve (303). The guide sleeve (303) is designed to be a tube of slightly greater interior diameter to the exterior diameter of the water level rod (106). The sleeve (303) is designed to interface with one of the gaps (305) in the grate (301) to provide for a much more limited gap for the water level rod (106) to move through. As such the sleeve (303) may be designed to be press fit through two adjacent grate bars (307) and be held in place by friction. Alternatively, the guide sleeve (303) may be attached to the grate (301) in another fashion as known by those of ordinary skill.

The final component of the disclosed device (101) is an alarm assembly (108). Generally, any known alarm assembly which is capable of activation through mechanical means and emits a warning sign such as a sound or light when activated is contemplated in the device (101) described herein. For example, one contemplated alarm assembly (108) to be utilized in the device (101) is a commercial smoke alarm. In an alternative embodiment, the alarm assembly (108) can be designed to provide for a remote notification instead of a proximity notification. A sound or light alarm would generally be intended to notify a person in proximity to the device (101) of rising water. In such an alternative embodiment, the target user need not be in proximity and at bodily risk due to the rising water.

An example of an alternative alarm assembly (108) would be to have the alarm assembly (108), when triggered, communicate with a remote device. For example, the alarm assembly (108) may send a signal using any conventional wireless technology (including without limitation, Bluetooth™, Wi-Fi, Cellular, PCS, radio, microwave, optical laser, or any combination) to a remote location, which can then display an indication of the alarm condition. This could be, for example, the alarm assembly (108) calling a user's phone number, sending a text message, sending an email, or activating an alarm notice as part of a dedicated mobile device application ("app"). The alarm assembly (108) could alternatively or additionally notify a professional alarm service provider (such as a burglar alarm service company) of the alarm condition who could then respond and/or notify the user as the user desired. In a still further embodiment, the alarm assembly (108) could include a computer communication component which is designed to interface with another computer utilizing known communication methodologies. For example, the alarm assembly could connect via a home network to a home router which is then used to send a signal external to the home to a central processor, such as at a service provider, to notify them that the device (101) has triggered.

Figure 7:
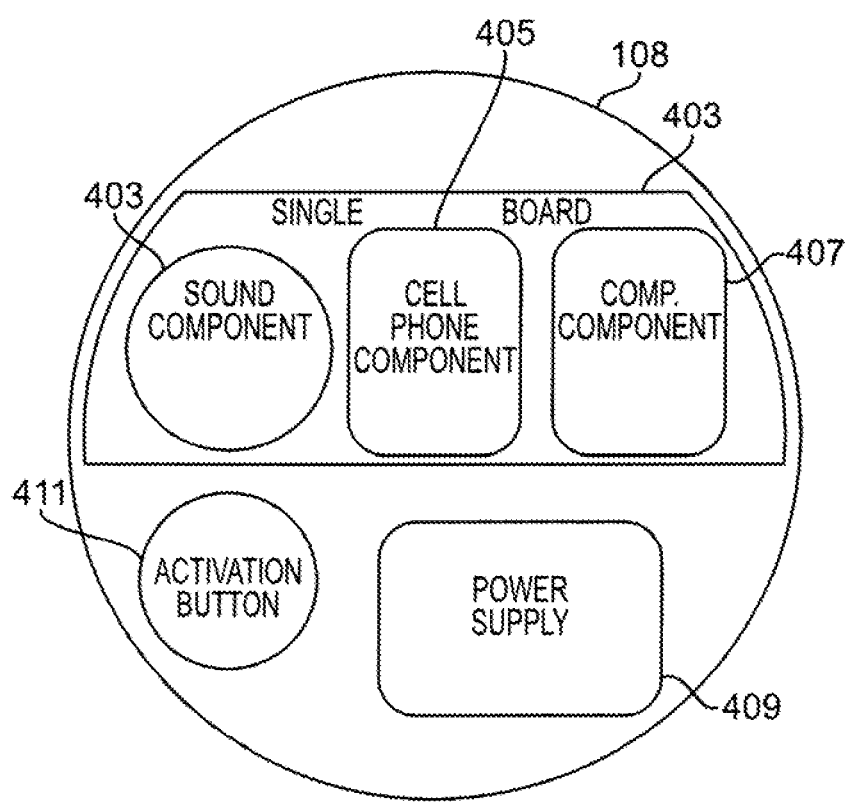
FIG. 7 provides for an embodiment of a layout of electronics.

FIG. 7 provides for a general block diagram of the components of an alarm assembly (108) which can be used in an embodiment of the device (101). In this embodiment, the alarm assembly (108) includes a circuit board (401) upon which is mounted appropriate electronics for generating an audible alarm (403) at the location of the device (101). There is also included a cellular communication transceiver or transmitter and associated electronics (405) that allow for the alarm assembly (108) to communicate using a cellular network such as directly to a user's cellular telephone, smartphone, or other telephonic device. There is also included a computer (407) which serves to provide communication to and from a computer network via an onboard transmitter. In conjunction with this, this device (101) may be able to act as an "Internet-of-Things" ("IoT") connected device allowing it to be controlled form another computer system in a server/client relationship or to otherwise intercommunicate using a computer network. As such, it can provide updates in real-time or near-real time as to its current status to any other computer device. As depicted in FIG. 7, the alarm assembly can also include a power source (409) such as a battery, solar generator, kinetic storage mechanism, or any other form of power source known now or later discovered suitable for powering the electronics.

The alarm assembly (108) of FIG. 7 can include an activation button (411) which can serve as a trigger. The activation button can be a traditional push button that when depressed will close a circuit and connect various components of the board (401) with power, or will serve to indicate that the water level has reached an alarm level to components which may already be supplied with power. The alarm is generally used by placing the device into a "no flood" state in the desired use location. Generally, this will be a location where there is no water at the base (102) and the float (104) will be positioned resting on the base (103) internal to the tube (103). However, if the system (101) is designed to be used in a wet arrangement where the device (101) is already partially submerged, but an increase in depth is to be directed. In this state the float (104) will already be suspended at a height above the base (102) corresponding to the starting water level. The length of the water level rod (106) is selected to correspond with the amount of increase of water depth that the device is designed to detect. The water level rod (106) has a length selected so that the length plus the selected water depth is generally equal to distance between the flange (206) and the alarm button (411) at the float's (104) starting position. The float is then positioned in the tube (103) with the support rod (105) through the hole (204).

The guide sleeve (303) is positioned in the grate (301) and the grate is positioned in the tube (103) toward the anterior end (201) compared to the float (104). The exact position can be variable, but will generally be selected so the water level rod (106) extends fully through the guide (303). The water level rod (106) and guide sleeve (303) will also be positioned so that the water level rod (106) moves vertically through the guide sleeve (303) and is aligned to contact the button (411).

When water levels rise, the float (104) will be moved toward the anterior end (201) of the tube (103) by water flowing into the proximal end (202) of the tube (103). The float is constrained to vertical motion by the interaction of the hole (204) and support rod (105). The hemispherical portion (208) can also assist in keeping the float (104) moving vertically without twisting. As the float (104) rises, the water level rod (106) moves through the guide sleeve (303) until it contacts activation button (411). Upon the water level rod (106) depressing the button (411), the various components of the alarm assembly (108) are activated and the device enters an alarm situation.

A device (101) with a remote transmitting alarm assembly (108) which can communicate via cellular communication, computer network, or related communication can be particularly useful to inhibit property damage when a user is not available to monitor potential water damage. Because the device (101) is preferably temporary, it can be used, for example, in a residence to monitor for potential flooding during a particularly rainy time of year, but removed when it is unlikely to be necessary. Similarly, it can be used to monitor crops or livestock that is near a river, lake, or other natural or manmade body of water which may be subject to flooding. For example, free range cattle may be herded into an area near a river as their current grazing location. The river could potentially be subject to flooding depending on conditions upstream which may be unknown to the owner of the livestock which could cause loss of some or all of the livestock if rising water is not detected quickly. Positioning a number of the devices (101) near the body of water could allow a remote rancher to detect the rising water and dispatch hands to move the livestock to higher ground should an alarm situation occur.

In an embodiment, the device (101) can be one of a plurality of related devices which are connected together using a computer network. The devices (101) can communicate with a central server to coordinate their operation, or one or more of the networked devices can operate in the manner of a central server. In such an arrangement, the system can provide not only indications of its own water detection (alarm) state, but can provide indications of water changes generally. As such, a plurality of devices (101) could, for instance, monitor the changes in water level around a reservoir or river allowing emergency officials or researchers to more accurately determine the current state of rising floodwaters at multiple locations simultaneously. Because the device (101) can be a temporary installation and different devices can be set to activate at different water levels, it provides for benefits over permanent installations as it can be repositioned to deal with temporary flood states or potential flood states.

It should be apparent that the design of the device (101) can be particularly suited to an application in a remote area where it's installation needs to be temporary. As the device (101) can be quite tall (2, 3, 4, 5 6, 7 or 8 or more feet tall) in an embodiment, the device can be sized and shaped so that it is easy to grasp a handle positioned on the anterior end (201) from horseback or from a moving utility or all-terrain vehicle (ATV). This can allow for the devices (101) to be easily placed in remote locations, and for them to potentially be recovered even if they are within rising waters.

As mentioned briefly previously in this application, regardless of the type of alarm generated, the alarm assembly (108) will generally be attached at or to the anterior (201) end of the main body (103). In one embodiment, the alarm assembly (108) will fit within the main body (103) near its anterior end (201). In another embodiment, the alarm assembly (108) will be permanently attached to the anterior end (201) of the main body (103) via an attachment methodology known to those of ordinary skill in the art. Further, in another embodiment, the alarm assembly (108) will be attached to the anterior end (201) of the main body (103) via a series of couplings and housings. For example, as shown in the embodiment depicted in FIGS. 1-4, the alarm assembly (108) will fit within about a 4 inch PVC collar and about a 4 inch threaded collar which are placed on about the 4 inch main body (103). In the embodiment of the device (101) in which a grate is utilized, the grate will generally be placed before the alarm assembly (108) (i.e., closer to the posterior end (202) of the main body (103)) between the PVC collar.

Alternative supplemental components of the disclosed device (101) which could be utilized in alternative embodiments include a door on the surface area of the main body (103) which would allow a user easy access to the internal portion of the main body (103) such that a user could easily adjust the height of the water level rod (106) and, thus, the height of rising water at which the alarm assembly (108) would be activated. Another supplemental component of the disclosed device (101) will be a threaded cap which will close off the top of the main body (103) and/or the housing and coupling attached to the anterior end (201) of the main body (103). In certain embodiments, the cap or lid may have an opening therein which would allow for water to leave the interior of the main body (103). It is also contemplated that in certain embodiments a handle mechanism will be attached to the device (101) to facilitate the movement of the device (101) from one location to another location in its portable embodiments. Depending upon the embodiment, this handle may be located on the side of the main body (103) or at the top of the main body (103) on the cap or lid. Another contemplated supplemental component in different embodiments is one or more oversized clamps that will connect the water level rod (106) and the stabilizing rod (105).

In some, the portable lightweight flood warning device (101) described herein is a lightweight reliable inexpensive flood warning and/or monitoring device which solves many of the problems inherent to the devices of the prior art while retaining the ability to warn the occupants of a room, building or remote place of the damage of rising water before any equipment or goods are submerged in the flood, thereby saving lives and money. In particular, the device (101) described herein is distinguished from the float-based device of the prior art by its structure which isolates the electronics associated with the alarm assembly (108) and keeps them away from rising flood water and debris—protecting the device from the malfunctions that are currently associated with these devices in the art.

The qualifier "generally," as used in the present case, would be understood by one of ordinary skill in the art to accommodate recognizable attempts to conform a device to the qualified term, which may nevertheless fall short of doing so. This is because terms such as "sphere" are purely geometric constructs and no real-world component is a true "sphere" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and geometric relationships contemplated herein regardless of the inclusion of such qualifiers to include a range of variations from the literal geometric meaning of the term in view of these and other considerations.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. An alert device for detecting rising water levels, the alert device comprising:
   a weighted base plate;
   an alarm assembly having an activation mechanism;
   a main body having an anterior end and a posterior end, a length therebetween and a hollow interior, said posterior end of said main body being attached to said base plate and positioned approximately vertically therefrom and said alarm assembly being attached toward said anterior end of said main body, said main body including within said hollow interior:
      a float having an opening therethrough and being smaller than said main body, said float having a generally hemispherical portion;
      a stabilizing rod slideably positioned through said opening of said float; and
      a water level rod having an anterior end and a posterior end and a length therebetween, said float being attached to said water level rod at or near its posterior end and said water level rod extending approximately vertically therefrom into the interior of said main body so as to contact said activation mechanism if said float moves vertically upward a predetermined distance.

2. The alert device of claim 1 wherein said float also includes an extending flange and said water level rod is attached to said flange.

3. The alert device of claim 1 wherein said anterior end of said main body is attached to the base plate via an attachment methodology that creates a space between the posterior end of the main body and the base plate, thereby allowing for water to enter and leave the hollow interior of the main body.

4. The alert device of claim 1 wherein said water level rod is comprised of a plurality of segments.

5. The alert device of claim 4 wherein said plurality of segments are selected from a larger set of segments of different length.

6. The alert device of claim 1 wherein the device is portable.

7. The alert device of claim 1 wherein said alarm assembly includes a cellular transmitter.

8. The alert device of claim 1 wherein said alarm assembly includes a computer which can communicate with a computer network.

9. The alert device of claim 1 wherein said alarm assembly includes an audible alarm.

* * * * *